US011155926B2

(12) United States Patent
Allely et al.

(10) Patent No.: US 11,155,926 B2
(45) Date of Patent: Oct. 26, 2021

(54) METHOD FOR THE PRODUCTION OF METAL SHEET HAVING A ZNMG OR ZNALMG COATING, COMPRISING THE APPLICATION OF A BASIC SOLUTION OF A MAGNESIUM ION COMPLEXING AGENT, AND RESULTING METAL SHEET

(71) Applicant: ARCELORMITTAL, Luxembourg (LU)

(72) Inventors: Christian Allely, Maizieres-les-Metz (FR); Tiago Machado Amorim, Metz (FR); Astrid Coffigny, Maizieres-les-Metz (FR)

(73) Assignee: ARCELORMITTAL, Luxembourg (LU)

( * ) Notice: Subject to any disclaimer, the term of this patent is extended or adjusted under 35 U.S.C. 154(b) by 480 days.

(21) Appl. No.: 14/768,350

(22) PCT Filed: Feb. 18, 2014

(86) PCT No.: PCT/EP2014/053102
§ 371 (c)(1),
(2) Date: Aug. 17, 2015

(87) PCT Pub. No.: WO2014/125117
PCT Pub. Date: Aug. 21, 2014

(65) Prior Publication Data
US 2016/0010216 A1 Jan. 14, 2016

(30) Foreign Application Priority Data

Feb. 18, 2013 (WO) .................. PCT/FR2013/050332

(51) Int. Cl.
| | | |
|---|---|---|
| *C23C 2/26* | (2006.01) | |
| *C23C 28/00* | (2006.01) | |
| *C23C 2/06* | (2006.01) | |
| *C23G 1/20* | (2006.01) | |
| *B32B 15/01* | (2006.01) | |
| *C23C 2/40* | (2006.01) | |
| *C23C 22/60* | (2006.01) | |
| *C23C 22/68* | (2006.01) | |

(52) U.S. Cl.
CPC .......... *C23C 28/321* (2013.01); *B32B 15/013* (2013.01); *C23C 2/06* (2013.01); *C23C 2/26* (2013.01); *C23C 2/40* (2013.01); *C23C 22/60* (2013.01); *C23C 22/68* (2013.01); *C23C 28/34* (2013.01); *C23G 1/20* (2013.01)

(58) Field of Classification Search
None
See application file for complete search history.

(56) References Cited

U.S. PATENT DOCUMENTS

| | | | | |
|---|---|---|---|---|
| 3,444,007 A * | 5/1969 | Maurer | ................... | C23C 22/60 148/273 |
| 3,840,481 A * | 10/1974 | Miller | ...................... | C23G 1/14 510/420 |
| 6,235,410 B1 * | 5/2001 | Komatsu | ................... | C23C 2/06 428/659 |
| 6,312,812 B1 * | 11/2001 | Hauser | ..................... | B05D 7/14 428/412 |
| 8,785,000 B2 * | 7/2014 | Maalman | ................ | B32B 15/01 428/659 |
| 2004/0256089 A1 * | 12/2004 | Kobayashi | .............. | C23C 22/78 165/133 |
| 2010/0055344 A1 | 3/2010 | Ostwald et al. | | |
| 2012/0145282 A1 * | 6/2012 | Kodama | ................. | C23C 22/50 148/247 |
| 2012/0282488 A1 * | 11/2012 | Fujii | .................... | C23C 28/021 428/677 |

FOREIGN PATENT DOCUMENTS

| | | |
|---|---|---|
| CA | 973070 A | 8/1975 |
| CA | 2650719 | 11/2011 |
| CN | 102965680 A | 3/2013 |
| DE | 2 328 763 | 2/1974 |
| EP | 1857567 | 11/2007 |
| EP | 2 458 031 | 5/2012 |
| JP | 2001192872 A | 7/2001 |
| JP | 2002097559 | 4/2002 |
| JP | 2002-241962 | 8/2002 |
| JP | 2009191317 | 8/2009 |
| WO | WO 2007/132008 A1 | 11/2007 |

* cited by examiner

*Primary Examiner* — David P Turocy
(74) *Attorney, Agent, or Firm* — Davidson, Davidson & Kappel, LLC

(57) ABSTRACT

A method for the production of metal sheet including a substrate having two faces, at least one of which is coated with a metal coating including between 0.1 and 10% by weight of Mg and optionally between 0.1 and 20% by weight of Al, the remainder of the metal coating being Zn. The method includes at least the steps of providing a steel substrate having two faces, depositing a metal coating on at least one face hot dipping of the substrate, solidifying the metal coating, applying onto the outer surfaces of the metal coating an aqueous solution having a pH of 7 to 13 and including a magnesium ion complexing agent, for which the dissociation constant pKd of the complexing reaction of the agent with the magnesium is greater than or equal to 2, and to the metal sheet obtainable with this method.

17 Claims, 1 Drawing Sheet

METHOD FOR THE PRODUCTION OF METAL SHEET HAVING A ZNMG OR ZNALMG COATING, COMPRISING THE APPLICATION OF A BASIC SOLUTION OF A MAGNESIUM ION COMPLEXING AGENT, AND RESULTING METAL SHEET

The present invention relates to a metal sheet comprising a substrate having two faces, at least one of them is coated with a metal coating comprising magnesium (Mg), and optionally aluminium (Al), the remainder being zinc (Zn), inevitable impurities and optionally one or several additional elements selected from Si, Sb, Pb, Ti, Ca, Mn, Sn, La, Ce, Cr, Ni or Bi and to its preparation method.

BACKGROUND

These metal sheets are for example intended for the automotive field, for the domestic appliance field or for the building industry.

They may be painted with view to their use, notably at an upstream stage of their production. These are then referred to as « pre-lacquered» metal sheets, the latter being particularly intended for the domestic appliance field or for the construction field.

In the case of pre-lacquered metal sheets, the whole of the method for producing such metal sheets being ensured by the steel worker, the costs and constraints related to painting at the users' are reduced.

Metal coatings essentially comprising zinc are traditionally used for their good protection against corrosion.

The addition of magnesium to the coating clearly increases corrosion resistance of these coatings, which may give the possibility of reducing their thickness or of increasing the corrosion protection guarantee over time. Further, the addition of aluminium (typically of the order of 0.1% by weight) to a coating based on zinc and magnesium also allows improvement of corrosion resistance, and makes the coated metal sheet easier to be formed. Thus, metal coatings essentially comprising zinc are presently in competition with coatings comprising zinc, magnesium and optionally aluminium.

The metal coatings comprising zinc and magnesium will be globally designated here under the term of zinc-magnesium or ZnMg coatings, and those comprising zinc, magnesium and aluminium will be generally designated here under the term of zinc-aluminium-magnesium or ZnAlMg coatings.

Before being used, the coated metal sheets are generally subject to various surface treatments.

In order to avoid corrosion of the coated metal sheets during their storage, a grease or oil film is generally applied on their surface. In order to use the coated metal sheets and to treat them at the surface, the metal sheets are generally degreased, usually by applying a basic solution. This degreasing step is generally achieved regardless of the subsequent surface treatment.

Diverse surface treatments of coated metal sheets are known from the literature. Their roles are to protect coated metal sheets from corrosion and/or to improve their properties, notably the adherence of thin organic coatings (TOC), of paint, of lacquer and/or of adhesive on the coated metal sheets. The most customary surface treatments are the following:

alkaline oxidation, during which a treatment solution consisting of a mixture of metal ions, generally of cobalt, typically Fe/Co or Co/Ni, is applied. The principle of this treatment is to carry out slight pickling of the surface by etching the surface aluminium and zinc oxides, the latter being followed by deposition of amorphous oxides.

chemical conversion treatment, for example by phosphating or by chromating. This treatment is always carried out at an acid pH in order to allow dissolution of a portion of the zinc at the surface into $Zn^{2+}$ ions capable of reacting with the conversion solution (typically a carboxylic acid such as oxalic acid for chromating, or phosphoric acid for phosphating) in order to form a protective layer on the coating (for example zinc oxalate or phosphates).

For example, application EP 2 458 031 describes a method for treating a metal surface with a chemical conversion treatment solution for improving its corrosion resistance and capability of adherence of coatings, said solution comprising:

(A) a water-soluble compound based on titanium or zirconium, and (B) an organic compound comprising 2 to 3 functional groups, notably glycine, as an agent for stabilizing the compound (A), and its pH being comprised between 2.0 and 6.5. A greater pH is not recommended since the removal of oxides from the metal surface will then be disadvantaged and the corrosion resistance will be reduced.

cataphoresis (« e-coat» ) which allows paint particles to be deposited on the surface of the coated metal sheet.

SUMMARY OF THE INVENTION

Now, it was observed that in spite of these surface treatments, the Zn—Mg or Zn—Al—Mg coatings do not always resist sufficiently to corrosion and/or that thin organic coatings or paints covering Zn—Mg or Zn—Al—Mg coatings deteriorated, in particular by the occurrence of blisters ("blistering").

Therefore there exists a need for improving:

corrosion resistance of metal sheets coated with Zn—Mg or Zn—Al—Mg, and/or adherence of thin organic coatings, of paints, of lacquers and/or of adhesives on these metal sheets coated with Zn—Mg or Zn—Al—Mg.

It is an object of the present invention to provide a method for preparing a metal sheet comprising a substrate having two faces, at least one of which is coated with a metal coating comprising between 0.1 and 10% by weight of Mg and optionally between 0.1 and 20% by weight of Al, the remainder of the metal coating being Zn, the inevitable impurities and optionally one or several additional elements selected from Si, Sb, Pb, Ti, Ca, Mn, Sn, La, Ce, Cr, Ni or Bi, the method comprising at least steps:

for providing a steel substrate having two faces,
for depositing a metal coating on at least one face by hot dipping of the substrate,
for solidifying the metal coating,
for applying on the outer surfaces of the metal coating an aqueous solution with a pH from 7 to 13 comprising:
an agent complexing magnesium ions, for which the dissociation constant pKd of the complexing reaction with magnesium is greater than or equal to 2, and
less than 1 g/L of cobalt ions.

The method may also comprise the following features, taken individually or as a combination:

The aqueous solution has a pH from 7 to 11.5.
The aqueous solution is free of cobalt ions.
The aqueous solution has a pH from 7 to 11.5 and is free of cobalt ions.

The metal coating comprises between 0.3 and 10% by weight of magnesium.

The metal coating comprises between 0.3 and 4% by weight of magnesium.

The metal coating comprises between 0.5 and 11% by weight of aluminium.

The metal coating comprises between 0.7 and 6% by weight of aluminium.

The metal coating comprises between 1 and 6% by weight of aluminium.

The mass ratio between the magnesium and the aluminium in the metal coating is strictly less than or equal to 1, preferably strictly less than 1, and still preferably strictly less than 0.9.

The agent complexing magnesium ions is selected from glycine, pyrophosphoric acid, triphosphoric acid, citric acid, oxalic acid, diamino cyclohexane tetraacetic acid, diethylenetriamine pentacetic acid, ethylenediaminetetraacetic acid and nitrilotriacetic acid, in a neutral or salt form, and a mixture thereof.

The agent complexing magnesium ions is selected from glycine, pyrophosphoric acid, diamino cyclohexane tetraacetic acid, diethylenetriamine pentacetic acid, ethylenediaminetetraacetic acid and nitrilotriacetic acid, in neutral or salt form, and a mixture thereof.

The agent complexing magnesium ions is selected from glycine, diamino cyclohexane tetraacetic acid, diethylenetriamine pentacetic acid, ethylenediaminetetraacetic acid and nitrilotriacetic acid, in neutral or salt form, and a mixture thereof.

The agent complexing magnesium ions is glycine or one of its salts.

The aqueous solution comprises from 1 to 300 g/L of the agent complexing magnesium ions.

The aqueous solution comprises from 10 to 20 g/L of the agent complexing magnesium ions.

The aqueous solution has a pH from 9 to 11.

The aqueous solution has a pH from 9 to 10.

The aqueous solution is applied at a temperature comprised between 20 and 70° C.

The solution is applied for a duration comprised between 0.5 s and 40 s on the outer surfaces of the metal coating.

The solution is applied for a duration comprised between 2 s and 20 s on the outer surfaces of the metal coating.

The invention also relates to a metal sheet having two faces, at least one of which is coated with a metal coating comprising between 0.1 and 10% by weight of Mg and optionally between 0.1 and 20% by weight of Al, the remainder being Zn, the inevitable impurities and optionally one or several additional elements selected from Si, Sb, Pb, Ti, Ca, Mn, Sn, La, Ce, Cr, Ni or Bi, obtainable by the above described method.

BRIEF DESCRIPTION OF THE DRAWINGS

The invention will now be illustrated with examples given as an indication, and not as a limitation, and with reference to the appended figures wherein.

DETAILED DESCRIPTION

Figure 1:
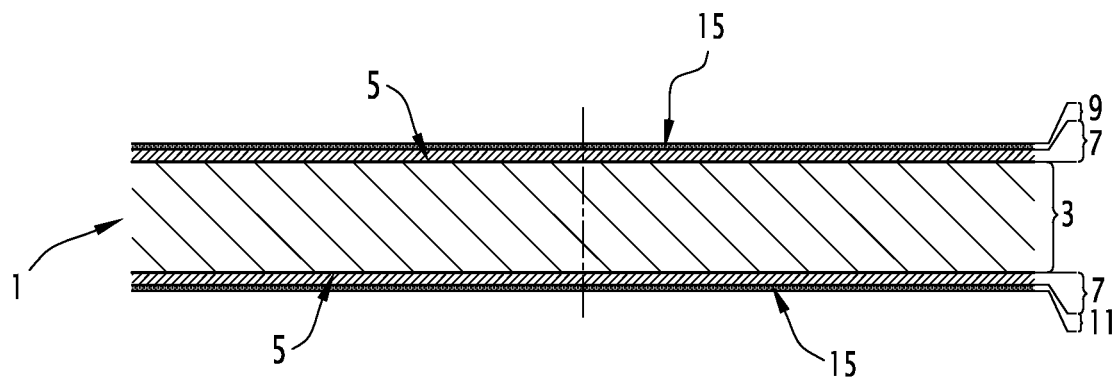
FIG. 1 is a schematic sectional view illustrating the structure of a metal sheet according to the invention.

The metal sheet 1 of FIG. 1 comprises a steel substrate 3 covered on each of both of its faces 5 with a metal coating 7. The coatings 7 are respectively covered with an upper paint film 9 and a lower paint film 11. As the metal sheet according to the invention is not necessarily covered with paint, there would be no departure from the scope of the invention if the upper paint film 9 and/or the lower paint film 11 were absent (alternatives not shown).

It will be observed that the relative thicknesses of the substrate 3 and of the different layers covering it, have not been observed in FIG. 1 in order to facilitate the illustration.

The coatings 7 present on both faces 5 are similar and only one will be described in detail subsequently. Alternatively (not shown), only one of the faces 5 has a coating 7.

The metal coating 7 comprises between 0.1 and 10% by weight, typically between 0.3 and 10% by weight, notably between 0.3 and 4% by weight of magnesium. Below 0.1% by weight of Mg, the coated metal sheet is not sufficiently resistant to corrosion and beyond 10% by weight of Mg, the ZnMg or ZnMgAl coating is too oxidized and cannot be used.

In the sense of the present application, when a range of figures is described as being between a lower limit and an upper limit, it is understood that these limits are included. For example, a coating comprising 0.1% or 10% by weight of magnesium is included when the expression "the metal coating 7 comprises between 0.1 and 10% by weight of magnesium" is used.

In an embodiment, the metal coating 7 comprises aluminium, typically between 0.5 and 11% by weight, notably between 0.7 and 6% by weight, preferably between 1 and 6% by weight of aluminium. Typically, the mass ratio between the magnesium and the aluminium in the metal coating 7 is strictly less than or equal to 1, preferably strictly less than 1, and still preferably strictly less than 0.9.

The inevitable impurities and additional elements selected from Si, Sb, Pb, Ti, Ca, Mn, Sn, La, Ce, Cr, Ni or Bi present in the metal coating 7 are due to contamination of the bath used during hot dipping. The weight content of each additional element is generally less than 0.3%.

The coating 7 generally has a thickness of less than or equal to 25 μm and conventionally aims at protecting the substrate 3 against corrosion. The embodiments described above relating to the coating 7 may of course be applied.

The paint films 9 and 11 are for example based on polymers. These polymers may be polyesters or halogenated derivatives of vinyl polymers such as plastisols, PVDF . . . . The films 9 and 11 typically have thicknesses comprised between 1 and 200 μm.

In order to produce the metal sheet 1, for example it is possible to proceed as follows.

The facility used may comprise a single and same line or for example two different lines for respectively producing the metal coating and the painting when the latter is carried out. In the case when two different lines are used, they may be used on the same site or on distinct sites. As regards the description, an alternative will be considered as an example when two distinct lines are used.

In a first line for producing a metal coating 7, a substrate 3 obtained by hot and then cold rolling is used. The substrate 3 is in the form of a strip which is run in a bath for depositing the coating 7 by hot dipping.

The bath is a bath of molten zinc containing magnesium and optionally aluminium. The bath may also contain up to 0.3% by weight of additional optional elements such as Si, Sb, Pb, Ti, Ca, Mn, Sn, La, Ce, Cr, Ni or Bi. These different additional elements may inter alia allow improvement in the ductility or the adhesion of the coating 7 on the substrate 3. One skilled in the art, who is aware of their effects on the characteristics of the coating 7, will know how to use them according to the sought additional goal. The bath may finally contain residual elements from supply ingots or resulting from the passage of the substrate 3 in the bath, a source of inevitable impurities in the coating 7.

After deposition of the coating 7, the substrate 3 is for example de-watered by means of nozzles projecting a gas on either side of the substrate 3.

The coating 7 is then left to cool in a controlled way so that it solidifies. Controlled cooling of the coating 7 is ensured at a rate preferably greater than or equal to 15° C./s between the onset of solidification (i.e. when the coating 7 just drops under the temperature of the liquidus) and the end of solidification (i.e. when the coating 7 attains the temperature of the solidus).

Controlled cooling of said or each coating 7 is ensured at a rate preferably greater than 10° C./s or further greater than 20° C./s.

Alternatively, the de-watering may be adapted for removing the coating 7 deposited on one face 5 so that only one of the faces 5 of the metal sheet 1 will finally be coated with a coating 7.

The thereby treated strip may then be subject to a so-called skin-pass step which allows it to be work-hardened and roughness to be imparted to it for facilitating its subsequent forming A grease or oil film is then generally applied on the coating 7 in order to protect it against corrosion.

The strip may optionally be coiled in order to store it or send it towards another surface treatment line and optionally pre-lacquering.

The outer surfaces 15 of the coating 7 are then usually subject to a degreasing step, generally by applying to them an aqueous basic solution.

Simultaneously or subsequently to this degreasing step, the outer surfaces 15 of the metal coating 7 are subject to a surface treatment step which consists of applying to them an aqueous solution with a pH from 7 to 13, notably from 7 to 12.5, preferably from 7 to 11.5 comprising an agent complexing the magnesium ions, for which the dissociation constant pKd of the complexing reaction with magnesium is greater than or equal to 2.

The pH of the applied aqueous solution comprising the agent complexing the magnesium ions is basic. Now, the step for degreasing the outer surfaces 15 of the coating 7 generally consists of applying to them an aqueous basic solution. Thus, the steps for degreasing and applying the aqueous solution with a pH from 7 to 13, notably from 7 to 12.5, preferably from 7 to 11.5 comprising an agent complexing magnesium ions may be carried out simultaneously. In order to apply the method according to the invention in existing surface treatment methods, it is then sufficient to add an agent complexing magnesium ions, for which the dissociation constant pKd of the complexing reaction with magnesium is greater than or equal to 2 in the basic solution used for the degreasing. The method according to the invention may therefore easily be applied in existing surface treatment lines, without it being necessary to modify these lines by adding thereto, steps and treatment solution tanks, which is an economical advantage. Indeed, the addition of a step for applying a treatment solution (generally followed by rinsing) is very expensive since, during industrial production, it is then necessary to modify the whole surface treatment chain for the metal sheets, and any modification of this chain requires testing of the corrosion resistance of the coated metal sheets obtained at the end of the chain over time. It is then necessary to wait for the result of these tests (i.e. generally months) in order to be able to use the surface treatment chain in an industrial way. It is therefore particularly advantageous that the degreasing steps and steps for applying the aqueous solution with a pH from 7 to 13, notably from 7 to 12.5, preferably from 7 to 11.5 comprising an agent complexing magnesium ions, for which the dissociation constant of the complexing reaction with magnesium is greater than or equal to 2, may be performed simultaneously.

The aqueous solution with a pH from 7 to 13, notably from 7 to 12.5, preferably from 7 to 11.5 comprises an agent complexing magnesium ions, for which the dissociation constant pKd of the complexing reaction with magnesium is greater than or equal to 2, notably greater than or equal to 3.

The formation of a complex from magnesium ions and from a complexing agent L is written as:

$$xMg^{2+}+yL^{u-} \leftrightharpoons [Mg_x(L)_y]^{2-yu+},$$

wherein x magnesium cations are sequestered by y complexing agents with a charge u− in order to form the complex $[Mg_x(L)_y]^{2-yu+}$.

With this reaction is associated a formation constant Kf which is written as:

$$Kf=[Mg_x(L)_y]/[Mg]^x[L]^y,$$

and a dissociation constant Kd which is written as:

$$Kd=1/Kf.$$

With Kd, is associated a pKd=−log (Kd). The larger the pKd, the more the formed complex is stable. The pKd values of the present application are for aqueous solutions for which the temperature is 20° C. or 25° C. and the ionic force is from 0.1 mol/L to 0.5 mol/L. When several complexing agents L may be bound to the magnesium ion (when y/x≥2), the pKd value in the sense of the application is for a single complexing agent L complexed with the magnesium ion (the pKd value generally increases with the number of complexing agents L complexed with the magnesium ion). For complexing agents L having acid-base properties (HL⇌H++L−), several forms of complexes with the magnesium ion may exist (for example MgHL and MgL). In the sense of the present application, the pKd values correspond to those associated with the complex [complexing agent in basic form/magnesium ion] (i.e. MgL), and not to the complex [complexing agent in acid form/magnesium ion] (for example MgHL). On this subject, at a pH from 7 to 13 of the aqueous solution applied in the method according to the invention, the complexing agent is generally in basic form, and the complex [complexing agent in acid form/magnesium ion] therefore does not generally exist. The pKd data of complexing agents provided hereafter are from the text book of A. Ringbom, "Les complexes en chimie analytique" (Complexes in analytical chemistry) Dunod—Paris 1967.

The agent complexing the magnesium ions is typically selected from glycine (pKd=3.1), pyrophosphoric acid (pKd=5.7), triphosphoric acid (pKd=5.7), citric acid (pKd=2.8), oxalic acid (pKd=2.4), diamino cyclohexane tetraacetic acid (DCTA) (pKd=10.3), diethylenetriamine pentacetic acid (DTPA) (pKd=9.3), ethylenediaminetetraacetic acid (EDTA) (pKd=8.7) and nitrilotriacetic acid (NTA) (pKd=5.4), in a neutral or salt form, and a mixture thereof, notably selected from glycine, pyrophosphoric acid, diamino cyclohexane tetraacetic acid, diethylenetriamine pentacetic acid, ethylenediaminetetraacetic acid and nitrilotriacetic acid, in neutral or salt form, and a mixture thereof, typically selected from glycine, diamino cyclohexane tetraacetic acid, diethylenetriamine pentacetic acid, ethylenediaminetetraacetic acid and nitrilotriacetic acid, in neutral or salt form, and a mixture thereof, in particular selected from glycine and pyrophosphoric acid, in neutral or salt form, and a mixture thereof, for example glycine or one of its salts.

The aqueous solution with a pH from 7 to 13, notably from 7 to 12.5, preferably from 7 to 11.5 generally comprises from 1 to 300 g/L, notably from 5 g/L to 300 g/L, typically from 10 g/L to 300 g/L, for example from 10 to 20 g/L of the agent complexing magnesium ions.

The aqueous solution comprising an agent complexing the magnesium ions applied in the method is basic (pH from 7 to 13, notably from 7 to 12.5, preferably from 7 to 11.5). Its pH is preferably greater than 9, for example from 9 to 11, or even from 9 to 10.

In the method according to the invention, the aqueous solution with the pH from 7 to 13, notably from 7 to 12.5, preferably from 7 to 11.5 comprising an agent complexing magnesium ions may be applied at a temperature comprised between 20 and 70° C. The duration of application of the aqueous solution may be between 0.5 s and 40 s, preferably between 2 s and 20 s.

The aqueous solution with a pH from 7 to 13, notably from 7 to 12.5, preferably from 7 to 11.5 comprising an agent complexing the magnesium ions generally comprises few metal ions, notably few cobalt ions. Typically, the aqueous solution comprises less than 0.1 g/L, notably less than 0.05 g/L, for example less than 0.01 g/L of cobalt ions. Preferably, the aqueous solution is free of cobalt ions. Typically, the aqueous solution is free of metal ions. The aqueous basic solution is generally free of any oxidizing agent.

The solution with a pH from 7 to 13, notably from 7 to 12.5, preferably from 7 to 11.5 comprising an agent complexing magnesium ions may be applied by immersion, spraying or any other system. The temperature of the solution may for example be room temperature or any other temperature and subsequent rinsing and/or drying steps may be used.

This step for applying the basic solution comprising an agent complexing magnesium ions may be involved on the line for producing the deposits 7 or on the pre-painting line.

By "application on outer surfaces 15 of the metal coating 7 of an aqueous solution with a pH from 7 to 13, notably from 7 to 12.5, preferably from 7 to 11.5 comprising an agent complexing magnesium ions", is meant that the aqueous solution with a pH from 7 to 13, notably from 7 to 12.5, preferably from 7 to 11.5 comprising an agent complexing magnesium ions is put into contact with the outer surfaces 15 of the metal coating 7. It is therefore understood that the outer surfaces 15 of the metal coating 7 are not covered with an intermediate layer (a film, a coating or a solution) which would prevent the putting of the aqueous solution with a pH from 7 to 13, notably from 7 to 12.5, preferably from 7 to 11.5 comprising an agent complexing magnesium ions in contact with the outer surfaces 15 of the metal coating 7.

On this subject, the method may comprise (or be without any) other surface treatment step(s) other than the one consisting of applying an aqueous solution with a pH from 7 to 13, notably from 7 to 12.5, preferably from 7 to 11.5 comprising an agent complexing magnesium ions (for example, a surface treatment by alkaline oxidation, a chemical conversion treatment and/or a treatment by cataphoresis). When this (these) step(s) of a surface treatment lead(s) to the formation of a layer on the coating 7, this (these) other step(s) of surface treatment is(are) carried out simultaneously or after the step for applying an aqueous solution with a pH from 7 to 13, notably from 7 to 12.5, preferably from 7 to 11.5, comprising an agent complexing magnesium ions on the coating 7, so that there is no intermediate layer between the outer surfaces 15 of the metal coating 7 and the aqueous solution with a pH from 7 to 13, notably from 7 to 12.5, preferably from 7 to 11.5, comprising an agent complexing magnesium ions.

The aforementioned optional degreasing and surface treatment steps may comprise other rinsing, drying substeps . . . .

The application of the basic solution comprising an agent complexing magnesium ions may be reinforced by applying suitable mechanical forces on the outer surfaces 15 of the metal coating 7.

Such mechanical forces may be applied by a leveler, a rolling mill, for example for skin-pass, brushing, shot-blasting devices . . . .

These mechanical forces may have the function of altering the magnesium oxide or magnesium hydroxide layers. Thus, the brushing and shot-blasting devices may remove all or part of these layers.

Also, a leveler or a rolling mill may be adjusted for deforming the metal sheet which crosses it sufficiently for generating cracks in the magnesium oxide or magnesium hydroxide layers.

Mechanical forces will be applied preferably before the basic solution comprising the agent complexing the magnesium ions or while it is present on the outer surfaces 15 for promoting the action of the basic solution comprising the agent complexing magnesium ions.

The basic solution comprising the agent complexing the magnesium ions may then be applied in the leveler or in the rolling mill, for example as a rolling solution.

Painting, if it takes place, may then be achieved for example by depositing two successive paint layers, i.e. a primary layer and a finishing layer, which is generally the case for producing the upper film 9, or by depositing a single paint layer, which is generally the case for producing the lower film 11. Other numbers of layers may be used in certain alternatives.

The deposition of the paint layers is for example ensured with varnishing roller machines.

Each deposition of a paint layer is generally followed by a baking step in an oven.

The thereby obtained metal sheet 1 may again be coiled before being cut out, optionally formed and assembled with other metal sheets 1 or with other elements by the users.

The invention is based on the unexpected discovery that the application on the outer surfaces 15 of the metal coating 7 obtained by hot dipping of an aqueous solution with a pH from 7 to 13, notably from 7 to 12.5, preferably from 7 to 11.5 comprising an agent complexing magnesium ions, for which the dissociation constant pKd of the complexing reaction with magnesium is greater than or equal to 2, gives the possibility of improving corrosion resistance and/or the adherence of thin organic coatings, of paints, of lacquers and/or adhesives on the obtained coated metal sheets, notably by limiting or even suppressing the blistering phenomenon of paint films 9 and 11 when the metal sheet 1 is subject to a corrosive environment.

Without intending to be bound to particular theories, it would seem that:

the magnesium oxides and/or hydroxides present at the surface of the Zn—Mg or Zn—Al—Mg coating would be able to promote corrosion and/or occurrence of the aforementioned blistering phenomenon, and the application on the outer surfaces 15 of the metal coating 7 of the aqueous basic solution comprising an agent complexing magnesium ions, for which the dissociation constant pKd of the complexing reaction with magnesium is greater than or equal to 2, allows at least partly suppression of the magnesium oxides and/or hydroxides present on the outer surfaces 15 of the metal coating 7.

By magnesium oxide or magnesium hydroxide are meant here molecules of the $Mg_xO_y$ type, or molecules of the $Mg_x(OH)_y$ type, or further a mixture of both of these types of molecules.

Analyses by XPS spectroscopy (X-ray Photoemission Spectroscopy) of the outer surfaces 15 of the coating 7 show the predominant presence of magnesium oxide or magnesium hydroxide, even when the coating 7 comprises aluminium with similar aluminium and magnesium contents. However, in usual coatings essentially comprising zinc and aluminium in a small proportion, the outer surfaces of the metal coatings are covered with an aluminium oxide layer, in spite of the very small aluminium content. For similar contents of magnesium and aluminium, one would therefore have expected to find largely aluminium oxide.

XPS spectroscopy was also used for measuring the thickness of the magnesium oxide or magnesium hydroxide layers present on the outer surfaces 15 before they are being painted. It appears that these layers have a thickness of a few nm.

It will be noted that these analyses by XPS spectroscopy were conducted on metal sheet samples 1 which had not been subjected to corrosive environments. The formation of the magnesium oxide or magnesium hydroxide layers is therefore related to the deposition of the coating 7.

Figure 2:
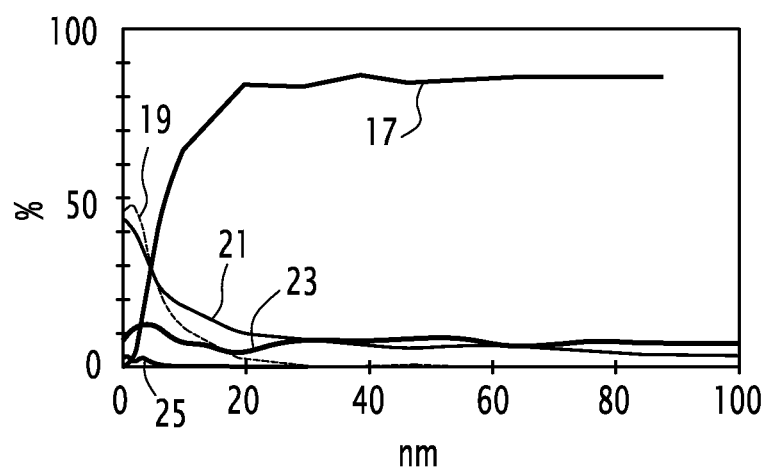
FIGS. 2 and 3 show analysis results by XPS spectroscopy of the outer surfaces of the metal coatings.
Figure 3:
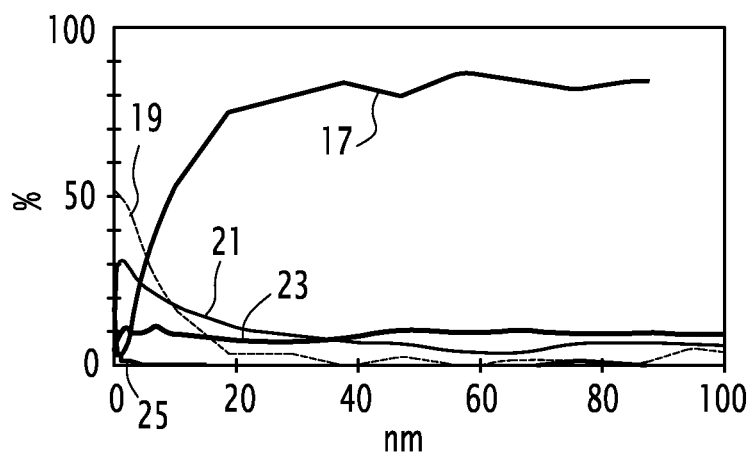

FIGS. 2 and 3 respectively illustrate the spectra of the elements for the energy levels C1s (curve 17), O1s (curve 19), Mg1s (curve 21), Al2p (curve 23) and Zn2p3 (curve 25) during XPS spectroscopic analysis. The corresponding atomic percentages are plotted in ordinates and the analysis depth in abscissas.

The sample analyzed in FIG. 2 corresponds to a coating 7 comprising 3.7% by weight of aluminium and 3% by weight of magnesium and subject to a conventional skin-pass step while the sample of FIG. 3 was not subject to such a step.

On both of these samples, according to the analyses by XPS spectroscopy it may be estimated that the thickness of the magnesium oxide or magnesium hydroxide layers is of about 5 nm.

It thus appears that these magnesium oxide or magnesium hydroxide layers are not removed by conventional skin-pass steps, nor moreover by conventional surface treatments.

Not only the assumed detrimental influence of magnesium oxides and/or hydroxides on the corrosion and/or the adherence of ROM (residual organic material), of paint, of lacquer and/or of adhesive but also their at least partial removal by applying an aqueous basic solution comprising an agent complexing the magnesium ions, are surprising for one skilled in the art.

The latter actually expects that the zinc and aluminium oxides (for a ZnAlMg coating) present at the surface are removed under a basic condition, but not the magnesium oxides. Indeed, the magnesium oxides and/or hydroxides do not dissolve (or only very little) under a basic condition, unlike zinc or aluminium oxides.

The use of the agent complexing magnesium ions for this purpose also seems surprising.

The ISO 8407:2009 standard describes that a chemical treatment with an aqueous solution of glycine at 250 g/L (which has a pH of 6.2) gives the possibility of removing the corrosion products of zinc and of its alloys. On the other hand, in this standard, the recommended chemical treatment for removing the corrosion products of magnesium and of its alloys is an aqueous composition comprising $CrO_3$, $AgNO_3$ and $[Ba(NO_3)_2]$, which is therefore without any agent complexing magnesium ions. The ISO 8407:2009 standard therefore does not suggest the use of a glycine solution (all the more so under basic conditions) for removing the magnesium oxides.

To the knowledge of the inventors, the prior art neither describes nor suggests the use of a basic solution comprising an agent complexing magnesium ions for removing magnesium oxides and/or hydroxides from a coated metal sheet of Zn—Mg or Zn—Al—Mg.

Without being intended to be bound to a particular theory, although under a basic condition, the equilibrium of the solubilization reaction of the magnesium hydroxides and/or oxides in order to form magnesium ions is strongly displaced towards magnesium hydroxides and/or oxides, it would seem that the agent complexing the magnesium ions, for which the pKd is greater than or equal to 2, allows the displacement of this equilibrium towards the formation of the complex, and therefore dissolution of the magnesium oxides and/or hydroxides. The removal of these magnesium oxides and/or hydroxides, and therefore the improvement in the corrosion resistance and/or in the adherence of thin organic coatings, paints, lacquers and/or adhesives on the coated metal sheets, would be less effective when complexing agents with a pKd of less than 2 are used or when an aqueous solution with a pH of more than 13 is used. On this subject, a range of pH from 9 to 10 would be optimum for removing the magnesium oxides and/or hydroxides.

Samples of metal sheets 1 were prepared with the method according to the invention, i.e. with a step for applying an aqueous solution with a pH from 7 to 13 comprising, as an agent complexing magnesium ions, glycine and as a degreasing agent, Gardoclean S5117 marketed by Chemetall for immersion duration of 20 s at a temperature of 50° C. under the conditions mentioned in the following table on the outer surfaces 15 of the metal coating 7 of Magnelis® of thickness of 10 μm. The obtained surfaces were analysed by Glow Discharge Optical Emission Spectrometry (GDOES) on a LECO GDS-850A apparatus for determining the amount of magnesium at the surface (table). The mass losses of the thereby treated coated metal sheets are indicated in the table. These mass losses do not exclusively correspond to the mass of magnesium oxide and/or hydroxide removed from the surface. Indeed, under a basic condition, zinc and aluminium oxides present at the surface are also removed, which emerges from the results of the comparative test in which a mass loss is observed when the applied solution was free of agent complexing magnesium.

TABLE

Results of GDOES

| Test No. | Gardoclean S5117 (g/l) | Glycine (g/l) | Temperature (° C.) | pH | Mass loss (mg/m² of face) | Area of the Mg peak in the MgO domain (SDL results) | % of MgO dissolved (according to SDL results) |
|---|---|---|---|---|---|---|---|
| 1 (comparative) | 20 | 0 | 50 | 12.1 | 93 | 0.98 | 0 |
| 2 | 20 | 20 | 50 | 9.1 | 302 | 0.15 | 84 |
| 3 | 45 | 20 | 50 | 10 | 296 | 0.23 | 77 |
| 4 | 45 | 20 | 50 | 11.1 | 130 | 0.31 | 68 |
| 5 | 22 | 10 | 50 | 10.7 | 42 | 0.38 | 61 |
| 6 | 22 | 10 | 50 | 9 | 393 | 0.08 | 92 |

What is claimed is:

1. A method for preparing a metal sheet comprising the steps of:
providing a substrate having two faces, at least one of the two faces being coated by a metal coating including:
from 0.1 to 10% by weight of Mg,
from 0.1 to 20% by weight of Al,
up to 0.3% by weight of one or several additional elements selected from Si, Sb, Pb, Ti, Ca, Mn, Sn, La, Ce, Cr, Ni or Bi, the weight % being for each additional element,
a remainder of the metal coating being Zn and inevitable impurities,
the metal coating deposited by hot dipping the substrate and solidifying the metal coating,
wherein a grease or oil film is present on the metal coating;
degreasing outer surfaces of the coating by applying on outer surfaces of the metal coating upon which the grease or oil film is present an aqueous solution with a pH from 9 to 13 to remove the grease or oil film from the metal coating, wherein the aqueous solution is free of metal ions and includes:
an agent able to complex magnesium ions, for which a dissociation constant pKd of the complexing reaction with magnesium is greater than or equal to 2, the applying of the aqueous solution including the agent able to complex magnesium ions at least partly suppressing magnesium oxides and/or hydroxides present on the outer surfaces of the metal coating.

2. The method according to claim 1, wherein the metal coating includes from 0.3 to 10% by weight of magnesium.

3. The method according to claim 2, wherein the metal coating includes from 0.3 to 4% by weight of magnesium.

4. The method according to claim 1, wherein the metal coating includes from 0.5 to 11% by weight of aluminum.

5. The method according to claim 4, wherein the metal coating includes from 0.7 to 6% by weight of aluminum.

6. The method according to claim 5, wherein the metal coating includes from 1 to 6% by weight of aluminum.

7. The method according to claim 1, wherein a mass ratio between the magnesium and the aluminum in the metal coating is less than or equal to 1.

8. The method according to claim 1, wherein the agent able to complex magnesium ions is selected from the group consisting of glycine, pyrophosphoric acid, triphosphoric acid, citric acid, oxalic acid, diamino cyclohexane tetraacetic acid, diethylenetriamine pentacetic acid, ethylenediaminetetraacetic acid and nitrilotriacetic acid, in a neutral or salt form, and & mixtures thereof.

9. The method according to claim 8, wherein the agent able to complex magnesium ions is selected from the group consisting of glycine, pyrophosphoric acid, diamino cyclohexane tetraacetic acid, diethylenetriamine pentacetic acid, ethylenediaminetetraacetic acid and nitrilotriacetic acid, in neutral or salt form, and mixtures thereof.

10. The method according to claim 9, wherein the agent able to complex magnesium ions is selected from the group consisting of glycine, diamino cyclohexane tetraacetic acid, diethylenetriamine pentacetic acid, ethylenediaminetetraacetic acid and nitrilotriacetic acid, in neutral or salt form, and mixtures thereof.

11. The method according to claim 10, wherein the agent able to complex magnesium ions is glycine or one of its salts.

12. The method according to claim 1, wherein the aqueous solution includes from 1 to 300 g/L of the agent able to complex magnesium ions.

13. The method according to claim 1, wherein the aqueous solution has a pH from 9 to 11.

14. The method according to claim 13, wherein the aqueous solution has a pH from 9 to 10.

15. The method according to claim 1, wherein the aqueous solution is applied at a temperature from 20 to 70° C.

16. The method according to claim 1, wherein the aqueous solution is applied for a duration from 0.5s to 40 s on the outer surfaces of the metal coating.

17. The method according to claim 1, wherein the aqueous solution comprises a degreasing agent.

* * * * *